July 12, 1932.   E. C. ALBRIGHT   1,866,693
ORNAMENTED HEADLAMP
Filed Dec. 31, 1930   2 Sheets-Sheet 1
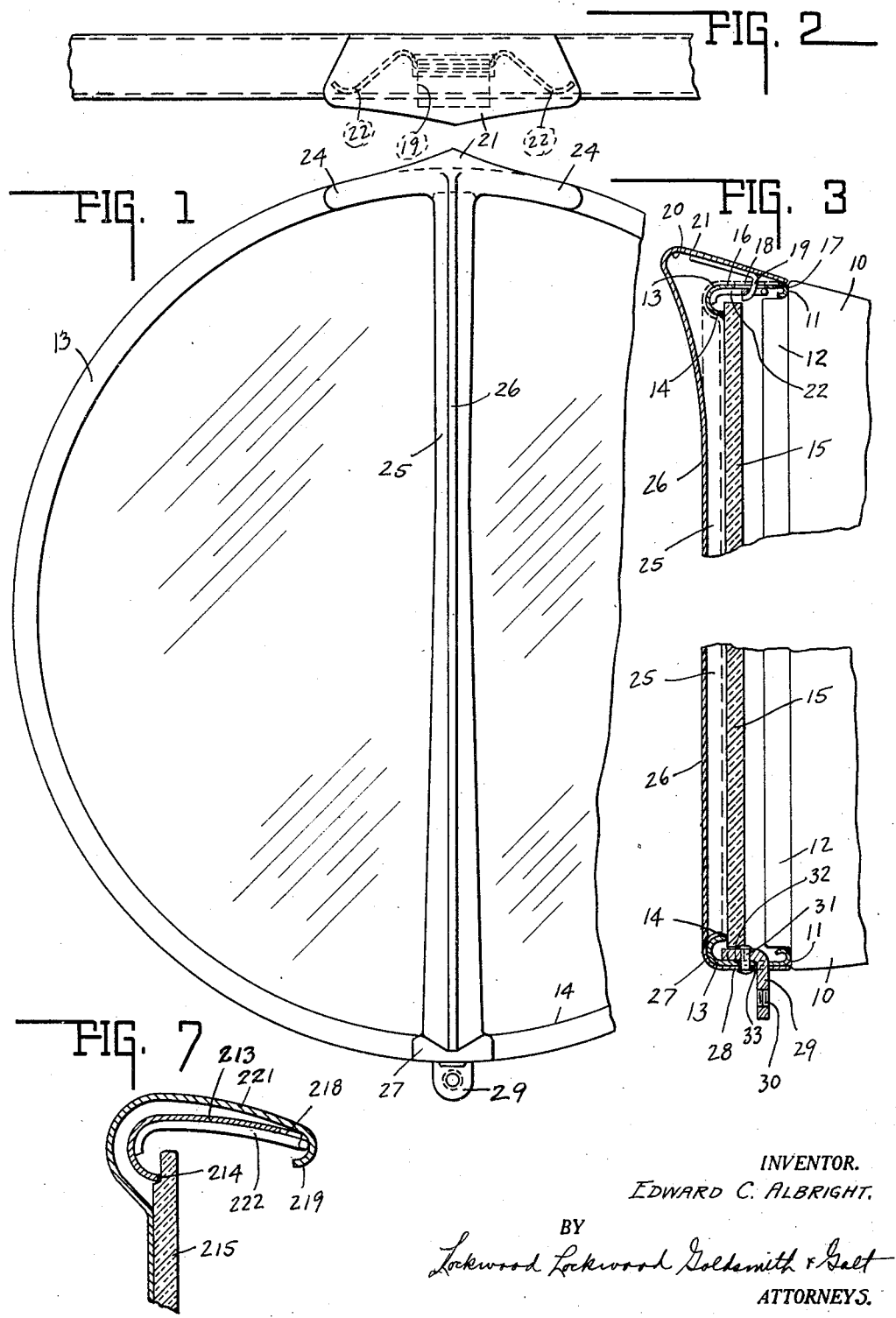
INVENTOR.
EDWARD C. ALBRIGHT.
BY
Lockwood Lockwood Goldsmith & Galt
ATTORNEYS.

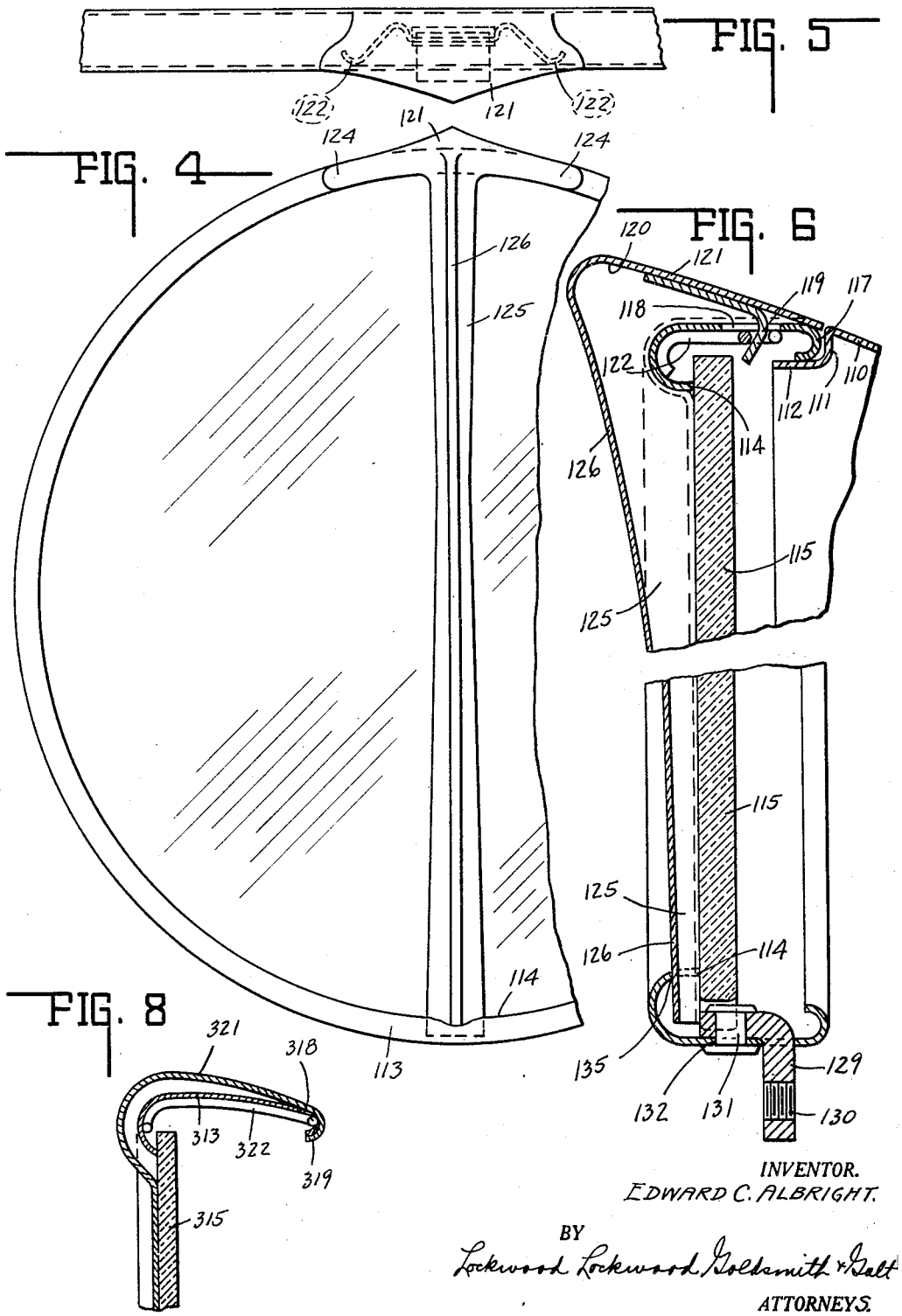

Patented July 12, 1932

1,866,693

UNITED STATES PATENT OFFICE

EDWARD C. ALBRIGHT, OF CONNERSVILLE, INDIANA, ASSIGNOR TO INDIANA LAMP CORPORATION, OF CONNERSVILLE, INDIANA

ORNAMENTED HEADLAMP

Application filed December 31, 1930. Serial No. 505,813.

This invention relates to an ornament for headlamps and the like, and particularly to the method of mounting the same, whereby the headlamp ornament has the appearance of being drawn in the door of said lamp.

The chief object of the invention is to construct a separate headlamp ornament separate and apart from the headlamp for the door thereof and so mount the same thereon as to give the appearance of being drawn in the door or lamp upon which it is mounted.

Another object of the invention is to extend the stamped sheet metal ornament so that it extends across the face of the lamp and is suitably anchored to the bottom thereof so that a unit assembly is obtained.

The full nature of the invention will be more clearly understood from the accompanying drawings and the following description and claims:

In the drawings, Fig. 1 is a front view of a headlamp door or rim with the ornament applied thereto. Fig. 2 is a top plan view thereof. Fig. 3 is a central sectional view through opposite ends of the lamp and door or rim with the invention applied thereto, the intermediate portion of the rim and ornament being omitted and the major portion of the headlamp casing likewise being omitted. Fig. 4 is a view similar to Fig. 1 and of a modified form of the invention. Fig. 5 is a view similar to Fig. 2 and of the form of the invention shown in Fig. 4. Fig. 6 is an enlarged central sectional view through the door rim with the ornament mounted thereon, intermediate portions being broken away. In Fig. 7 there is illustrated in enlarged central section a modified form of top mounting for the ornament. Fig. 8 is a similar view of still a further modified form of mounting for the top of the ornament.

In the drawings 10 indicates a lamp casing of any suitable conformation terminating in an in-turned flange 11 and a forwardly directed flange 12, the same forming a seat for a door or rim. The door or rim includes a peripheral bead portion 13 with an inner inwardly directed rim 14 which bears against a glass closure 15. The rim is extended rearwardly as at 16 and includes an inwardly and forwardly directed portion 17 that seats or rests upon the seat 11—12 of the casing. The rim, at its top portion, is suitably slotted or recessed as at 18 and extending through the same is a lug 19 soldered or otherwise suitably secured to the inside 20 of the ornament 21. The ornament 21 extends rearwardly and downwardly and slidably bears upon the rearward end of the rim.

The lug 19 is so arranged that it cooperates with the spring clip 22 carried by the rim for securing the ornament to the door or rim.

The ornament extends in wing formation as indicated at 24 and is arranged to bear against the forward portion of the rim 13 and to merge with the same so far as appearance is concerned.

The central portion of the ornament is extended as indicated at 25 and a central enlargement 26 coincides therewith. The depending portin 25 is enlarged laterally as at 27 adjacent the lower portion of the rim and envelops the same and extends rearwardly as at 28. The angular bracket or fixture 29 apertured at 30 to receive an anchorage for anchoring the rim to the casing is suitably secured, as by the rivet 31, to the rim, said rivet passing through the opening 32 in said rim and also passing through the opening 33 in the rearwardly directed extension of the ornament. In this manner, the ornament is anchored at opposite ends to the door rim and furthermore, this ornament gives the appearance of merging with the door rim and forming an integral portion thereof.

The formation of the ornament, particularly of the character set forth herein, wherein the extension 25 extends across the rim, permits the ornament to be formed from strip metal and also permits its anchorage in the simple manner before indicated upon the rim, thereby eliminating any expensive dies for forming said ornament integral with the rim and eliminating the enormous waste of stock which would be required if the extended member 25 were formed integral with the rim in a single stamping operation. The member 25 also serves as a closure guard.

In Figs. 4 to 6, inclusive, there is illustrated a modified form of the invention. In this form of the invention, similar parts bear numerals of the one-hundred series.

In the present form of the invention the method of mounting the lower end of the extension 125 is slightly different, and in this form the forward inner edge of the rim 114 is slotted as at 135 and the free lower end of the extension 125 is seated therein and bears against the closure 115. The rim, at its lower end, supports the usual clamping bracket 129 having the opening 130 for mounting the rim upon the casing, and the bracket is suitably secured to said rim by the rivet 131 that passes through opening 132 in said rim. The same advantages specified hereinbefore relative to the modification illustrated in Fig. 1 also apply to this last embodiment of the invention.

The two forms of the invention illustrated in Figs. 1 to 6, inclusive, have this common characteristic relative to the top mounting of the ornament, that is, the door rim includes at its rearward edge the inwardly and forwardly directed portion 17 and 117, respectively, receivable by the casing seat and the rearward end of the ornament slidably bears upon the rim adjacent thereto. The spring clip 22 and 122 normally bears upon the lug 19 and 119, respectively, to force the ornament rearwardly and for seating the same. In this type of mounting, the lug carried by the ornament passes through a slot in the rim and the ornament slides rearwardly on the rim until it is mounted.

In Fig. 7, a modified form of upper mounting for the ornament is illustrated and in this form, the rim 213 is notched or recessed as at 218. The rearward end of the ornament 221 is turned inwardly and thence forwardly and upwardly as at 219 and thus projects beyond the edge of the rim and extends through the notch. The spring 222 functions as before and engages this end 219 for forcing the ornament rearwardly over the door and for seating the same in fixed position thereon.

In Fig. 8 a modified form of mounting is illustrated and in this form the ornament 321 is extended rearwardly, inwardly and thence forwardly as at 319. The rim 313 in this instance is slotted as at 318 and the spring clip 322 projects therethrough and bears upon the portion 319 for forcing the ornament rearward over the door.

The invention claimed is:

1. In a headlamp, the combination with a door or rim and a closure therefor, of a sheet metal ornament having its lower end anchored to the rim and extending upwardly and outwardly over the same and thence rearwardly and downwardly and slidably associated with the rear exterior of the rim, said rim having a recess therein adjacent the slidable association, means rigid with the rear portion of the ornament and juxtapositioned relative to said recess, and an anchoring yielding means also juxtapositioned thereto and for engaging said means, one of said means extending through the recess.

2. In a headlamp, the combination with a door or rim and a closure therefor, of a sheet metal ornament having its lower end associated with the inner forward edge of the rim and extending upwardly and outwardly over the same and thence rearwardly and downwardly and slidably associated with the rear exterior of the rim, said rim having a recess therein adjacent the slidable association, means rigid with the rear portion of the ornament and juxtapositioned relative to said recess, and an anchoring yielding means also juxtapositioned thereto and for engaging said means, one of said means extending through the recess.

3. In a headlamp, the combination with a door or rim, and a closure therefor, of a sheet metal ornament exterior thereof and yieldingly secured to the rim at the upper rear portion thereof, said ornament merging with said rim for simulating an integral drawn ornamented rim, said ornament including a depending portion extending across the rim and having its extended end operatively associated with said rim for anchorage.

4. In a headlamp, the combination with a door or rim, and a closure therefor, of a sheet metal ornament exterior thereof and yieldingly secured to the rim at the upper rear portion thereof, said ornament merging with said rim for simulating an integral drawn ornamented rim, said ornament including a depending portion extending across the rim and having its extended end operatively associated with said rim for anchorage, a door or rim clamp secured to the rim, and means simultaneously securing said clamp and the extended end of said ornament to said rim.

5. In a headlamp, the combination with a door or rim, and a closure therefor, of a sheet metal ornament exterior thereof and yieldingly securing to the rim at the upper rear portion thereof, said ornament merging with said rim for simulating an integral drawn ornamented rim, said ornament including a depending portion extending across the rim and having its extended end operatively associated with said rim for anchorage, said rim opposite the upper ornament anchorage including at its forward inner edge a slot for the nesting of the extended lower end of the ornament.

In witness whereof, I have hereunto affixed my signature.

EDWARD C. ALBRIGHT.